(12) United States Patent
Wallace et al.

(10) Patent No.: US 6,331,016 B1
(45) Date of Patent: Dec. 18, 2001

(54) STABILIZER SYSTEM FOR TRAILERS

(75) Inventors: Johnny M. Wallace; Richard Hawk, both of Lewisville, TX (US)

(73) Assignee: Solid As A Look RV Stabilizer System, Inc, Lewisville, TX (US)

( * ) Notice: Subject to any disclaimer, the term of this patent is extended or adjusted under 35 U.S.C. 154(b) by 0 days.

(21) Appl. No.: 09/507,662

(22) Filed: Feb. 22, 2000

(51) Int. Cl.$^7$ ........................................................ B60S 9/02
(52) U.S. Cl. ..................................... 280/763.1; 280/766.1; 254/424
(58) Field of Search ............................ 280/763.1, 766.1, 280/475, 6.15, 6.153; 254/424, 418, 423, 45, 420, 99

(56) References Cited

U.S. PATENT DOCUMENTS

| | | | |
|---|---|---|---|
| 3,096,065 | * 7/1963 | Horne ..................... | 254/424 |
| 3,198,486 | * 8/1965 | Allen ...................... | 254/45 |
| 3,475,008 | * 10/1969 | Taylor ..................... | 254/86 |
| 3,537,724 | * 11/1970 | Matthews ................. | 280/150.5 |
| 3,760,906 | * 9/1973 | McGee ..................... | 280/150.5 |
| 3,823,958 | * 7/1974 | Trejbal .................... | 280/150.5 |
| 4,055,329 | * 10/1977 | Hammond ............... | 254/126 |
| 4,708,362 | * 11/1987 | Raetz ...................... | 280/763.1 |
| 5,205,586 | * 4/1993 | Tallman .................. | 280/764.1 |
| 5,238,266 | * 8/1993 | VanDenberg ........... | 280/766.1 |
| 5,474,330 | * 12/1995 | Meehleder .............. | 280/763.1 |
| 5,501,428 | * 3/1996 | Garceau .................. | 254/424 |
| 6,139,056 | * 10/2000 | Sourdeau ................ | 280/763.1 |
| 6,224,040 | * 5/2001 | Mejas et al. ............ | 254/423 |

FOREIGN PATENT DOCUMENTS

| | | | | |
|---|---|---|---|---|
| 644802-A5 | * | 8/1984 | (CH) ..................... | B60S/9/02 |
| 2233617-A | * | 1/1991 | (GB) ..................... | B60S/9/02 |

* cited by examiner

*Primary Examiner*—Brian L. Johnson
*Assistant Examiner*—Joselynn Y Sliteris
(74) *Attorney, Agent, or Firm*—John E. Vandigriff

(57) ABSTRACT

The invention is a stabilization system for a fifth wheel trailer that prevents rocking and swaying of the trailer when parked. The rear end of the trailer is supported by a pair of adjustable supports that have a top railing joining them. The rail is moveably mounted on the two supports and is secured to the under side of the trailer. Each of the supports is independently adjustable to lower it to the ground. A pair of cross-braces connect the top of one adjustable support to the base of the other support to prevent swaying of the trailer when parked. A tripod type support is placed under the front end of the trailer to support the front end and to eliminate swaying at the front end of the trailer.

11 Claims, 5 Drawing Sheets

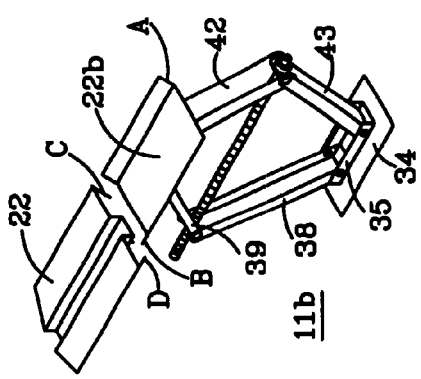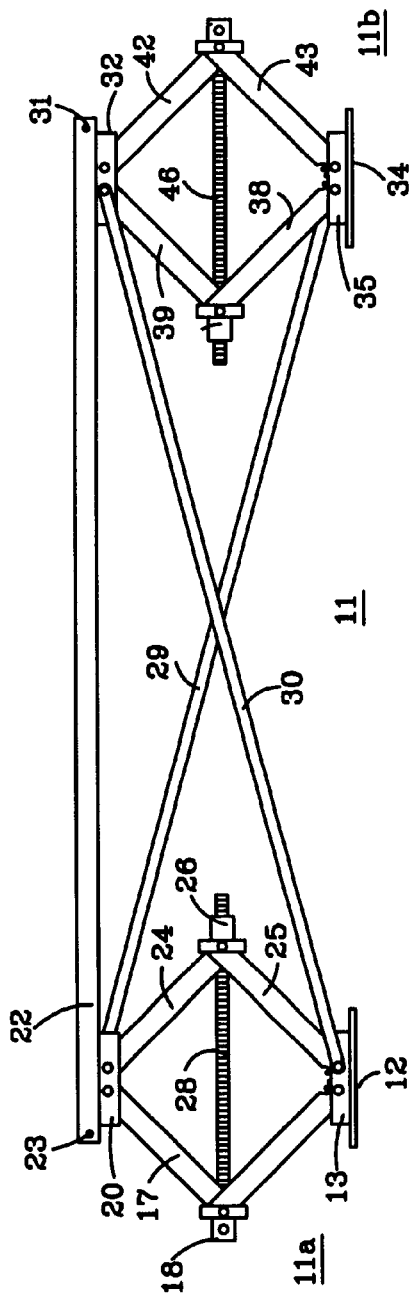

STABILIZER SYSTEM FOR TRAILERS

FIELD OF THE INVENTION

This invention relates to fifth wheel trailers, and more particularly to a stabilizer system to stabilize and prevent rocking and swaying of such trailers.

BACKGROUND OF THE INVENTION

Trailers, such as fifth wheel trailers, are subject to movement when a person enters the trailer, and the back end will rock and sway with the weight of a person. Stabilizers have been designed to support each side of the back end of trailers. While supporting the back end of the trailer, the supports do not necessarily prevent swaying, or side to side movement of the trailer when a person enters and walks through the trailer.

U.S. Pat. No. 5,205,586, shows a stabilizer assembly that is mounted under the bottom of the rear of the trailer. A single member is movable downward on each side of the trailer, independent of the other member. While each support does allow its respective supported side from moving downward, it is possible that there can be side-to-side or lateral movement of the trailer.

Another stabilizer for a fifth wheel trailer is illustrated in U.S. Pat. No. 5,575,492. The two supports, one on each side of the front end of the trailer, are independent of each other, but each support has an angled member that does provide some support against transverse movement.

U.S. Pat. No. 5,755,430 discloses leveling legs that extend downward from the front of the trailer to support the trailer on non-level surfaces.

Other devices are used to support the front of the trailer at the king pin, or pin that is attached to the vehicle towing the trailer. U.S. Pat. Nos. 4,596,371 and 5,197,311, disclose supports having two legs that are attached to the pin used in towing the trailer. These support help prevent rocking of the trailer relative to the axis of the of the trailer wheels.

SUMMARY OF THE INVENTION

The invention is a stabilization system for a fifth wheel trailer that prevents rocking and swaying of the trailer when parked. The rear end of the trailer is supported by a pair of adjustable supports that have a top railing joining them. The rail is moveably mounted on the two supports and is secured to the under side of the trailer. Each of the supports is independently adjustable to lower it to the ground. A pair of cross-braces connect the top of one adjustable support to the base of the other support to prevent swaying of the trailer when parked. A tripod type support is placed under the front end of the trailer to support the front end and to eliminate swaying at the front end of the trailer.

The technical advance represented by the invention as well as the objects thereof will become apparent from the following description of a preferred embodiment of the invention when considered in conjunction with the accompanying drawings, and the novel features set forth in the appended claims.

BRIEF DESCRIPTION OF THE DRAWINGS

FIG. 3 is an end view of the rear support;

FIG. 6 is an isometric view of one of the rear supports;

DESCRIPTION OF A PREFERRED EMBODIMENT

Figure 1:
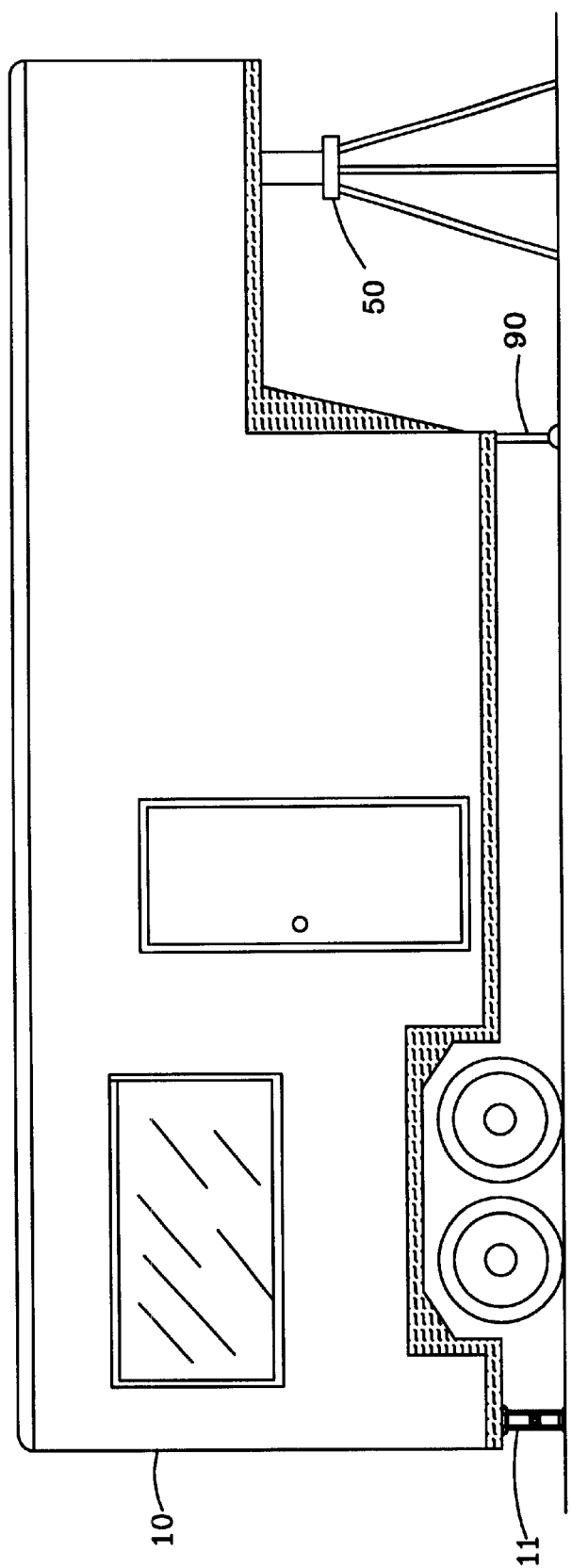
FIG. 1 is a side view of a fifth wheel trailer showing the rear and front supports of the invention.

FIG. 1 shows a fifth wheel trailer 10 with its back end supported by the adjustable support 11 (end view) according to the invention. The front end of the trailer is supported by the tripod 50 support of the invention. There are also two other supports 90 used to the front of the trailer. These supports are standard to fifth wheel trailers.

Figure 2:
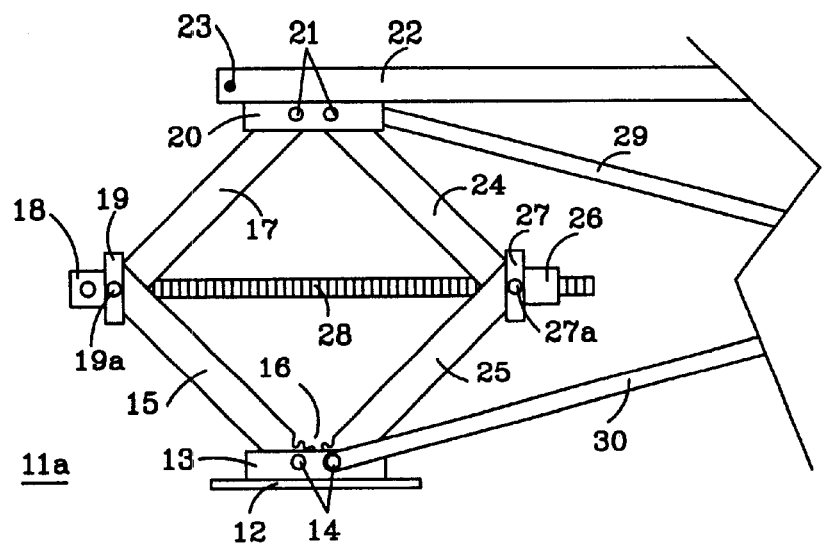
FIG. 2 shows one of the rear supports.

FIG. 2. Shows one end 11a of support 11. Support 11a is in the form of a scissor jack that may be raised and lowered by turning screw 28. Support 11a has a base 12 on which bracket 13 is mounted. Two arms 15 and 25 are rotatably secured in bracket 13 by bolts 14. The adjacent ends of arms 15 and 25 have meshing teeth indicated at 16. Teeth 16 ensure that arms 15 and 25 move together as screw 28, with end 18 is turned in threaded support 19. Screw 28 as well as arms 15, 17, 24 and 25 are connected together with threaded supports 19 and 27 with shafts 19a and 27a, respectively. Arms 17 and 24 are attached to bracket 20 by bolts 21. Rail 22 extends between the two supports 11a and 11b. Cross braces 29 and 30 interconnected supports 11a and 11b, as illustrated in FIG. 3.

FIG. 3 shows supports 11a and 11b interconnected with rail 22 and cross braces 29 and 30. Support 11b is similar to support 11a, with a base 34 and bracket 35 supporting arms 38 and 43. Arms 38 and 43 are also rotatably attached to arms 39 and 42, which are attached to bracket 32. Rail 22 is slidably mounted on brackets (illustrated in FIGS. 4 and 6), and attached to the underside of the trailer as illustrated in FIG. 5. Cross braces 29 and 30 interconnect supports ha and 11b to prevent swaying and moving of the braces and the trailer. Each support 11a, 11b can be moved up or down independent of each other by turning its respective screw (28 and 46) to move the support 11a, 11b against the ground under the trailer.

Figure 4:
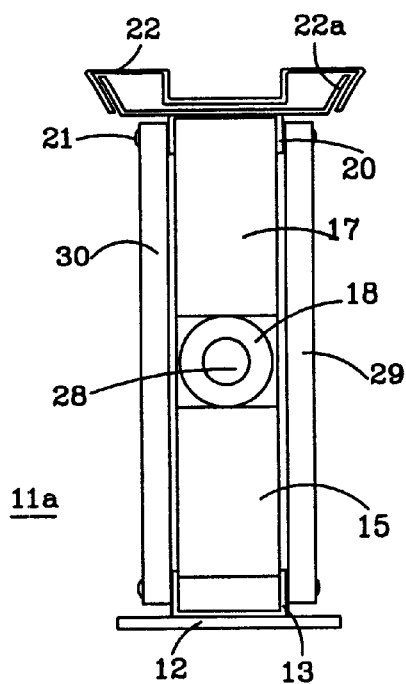
FIG. 4 is a side view of one of the supports.
Figure 5:
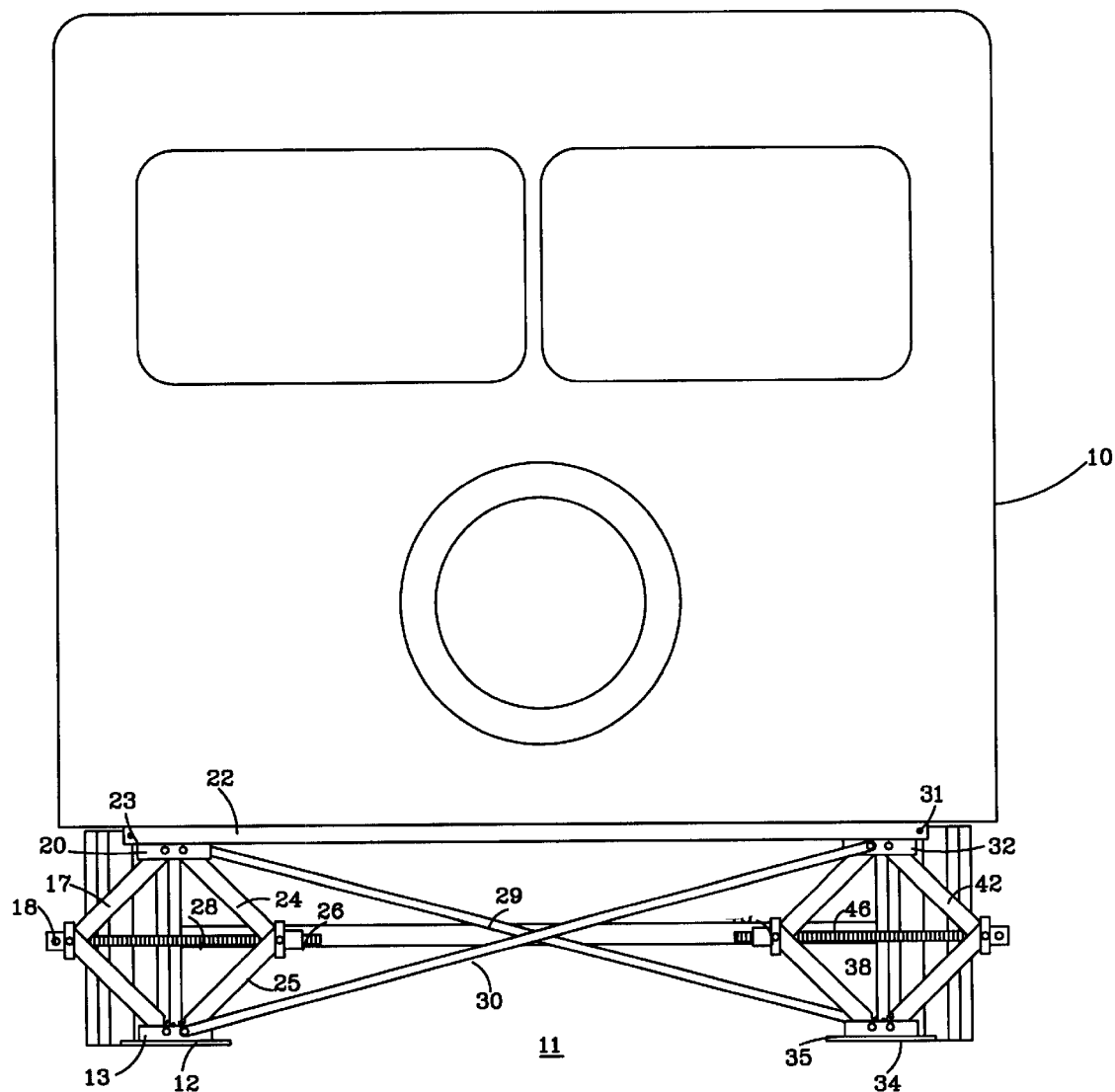
FIG. 5 is an end view of the trailer showing the rear support.

FIG. 4 is an end view of support 11a. Arms 15 and 17 are shown pivotally connected to bracket 13 and 20, respectively, and to threaded support 19. Cross braces 29 and 30 are also shown connected to brackets 13 and 20. Rail 22 is slidably mounted on rails 22a and 22b (22b is secured to support 11b). Rail 22 is prevented from moving off from rails 22a and 22b by screws or pins 23 and 31 (FIG. 3) which extend through rail 22 and engages rails 22a or 22b when rail 22 slides in one direction or the other.

FIG. 5 shows the end of trailer 10 supported by support 11. Support 11 is in an extend position, extending from the bottom of the trailer to the ground. When the trailer is being pulled, the support is in a collapsed or retracted position under the trailer. Support 11 has two adjustable supports 11a and 11b. Support 11a is in the form of a scissor jack that may be raised and lowered by turning screw 28. Support 11a has a base 12 on which bracket 13 is mounted. Two arms 15 and 25 are rotatably secured in bracket 13 by bolts 14. The adjacent ends of arms 15 and 25 have meshing teeth indicated at 16 (FIG. 2). Teeth 16 ensure that arms 15 and 25 move together as screw 28 is turned. Screw 28 as well as arms 15, 17, 24, and 25 are connected together with threaded supports 19 and 27 with shafts 19a and 27a, respectively.

Arms 17 and 24 are attached to bracket 20 by bolts 21. Rail 22 extends between the two supports 11a and 11b, and is attached to the bottom of trailer 10. Cross braces 29 and 30 interconnected supports 11a and 11b. Support 11b is described in detail with reference to FIG. 3. Since each of supports 11a and 11b are independently adjustable, the end of the trailer may be supported and braced on uneven sloping ground.

FIG. 6 shows support 11b with rail 22 moved away from rail 22b. Rail 22b has sides A and B extending upward and slides into rail 22 with sides A and B adjacent to ends C and D, respectively. Travel of rail 22 on rails 22a and 22b is limited by pins or screws 23 and 31 (FIG. 3). Movement of rail 22 on rails 22a and 22b permit supports 11a and 11b to adjust to proved solid support when the bottoms ends (13 and 35) contact the ground as supports 11a and 11b are lowered to support each side of trailer 10.

Figure 7:
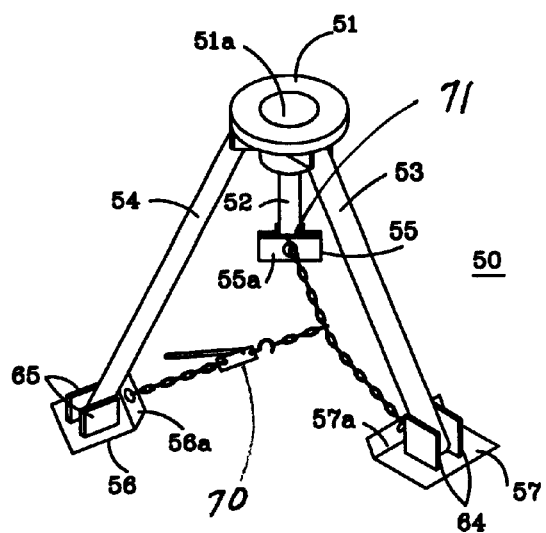
FIG. 7 shows the tripod-style front support.
Figure 8:
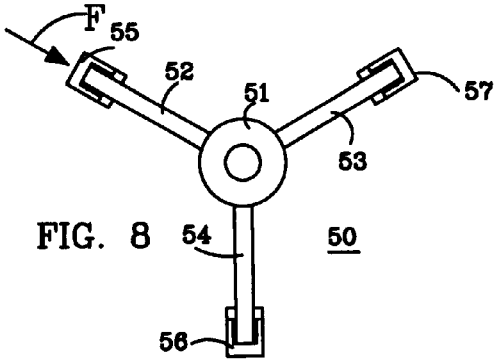
FIG. 8 is a top view of the front support.

FIGS. 7 and 8 shows the tripod style support for the front of the trailer. Support 50 has a top plate 51 with an opening 51a to receive the pin or mount that is used to secure the trailer to the back of the towing vehicle. Three legs 52, 53 and 54 extend outward and downward from plate 51 and are pivotally attached to plate 51. Each of legs 52, 53 and 54 have a bottom plate or foot 55, 57 and 56, respectively, to prevent each leg from penetrating the ground, and to provide better stabilization then the end of a small square or round leg would provide. Each leg has an angled edge, edges 55a, 56a, and 57a, and support brackets: 71, 65 and 64, respectively, with an opening through each angled edge to which a chain is attached. The attached chains prevent the legs from exceeding a preselected distance from the vertical center of plate 51. As illustrated in FIG. 7, plates 55a and 57a are connected by chain 62, and a chain and chain load binder 70 is connected between plate 56a and chain 62.

Figure 9:
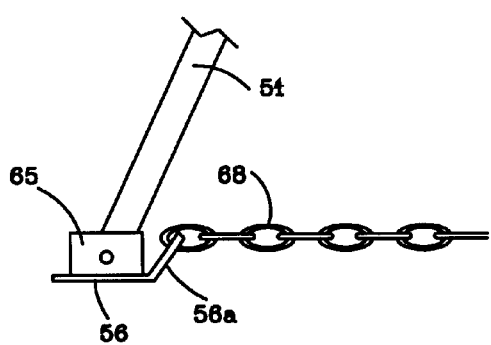
FIG. 9 shows the leg cable attachment on one of the legs.

More detail of the angled edge of plate 56 is shown in FIG. 9. The end of the chain and binder 68 is attached directly to angled edge 56a, or may be connected with a hook.

The use of a tripod type support provides better support than the two-legged support disclosed in the prior art. As illustrated in FIG. 8, by placing the plates 56, 57 of legs 54 and 53, FIG. 8, and plate 55 of leg 52, as illustrated, side sway and forward movement is limited or prevented.

The back support 11 and front support 50 may be used together or independent of each other, but the combination of the two eliminates movement of the trailer when parked and supported on the supports 11 and 50.

What is claimed is:

1. A stabilization system for a trailer, comprising:
   a pair of adjustable spaced apart supports, including a rail on each support;
   a second rail mounted on the underside of a trailer;
   said rails on each support slidably mounted in said second rail; and
   wherein each of said pair of adjustable supports includes a top bracket and a bottom bracket, and a cross-brace from each top bracket of each adjustable support to the bottom bracket of the other adjustable support.

2. The stabilization system according to claim 1, including a screw mechanism in each support for raising or lowering each of the pair of adjustable supports independent of each other.

3. The stabilization system according to claim 1, including a tripod style support for a trailer.

4. The stabilization system according to claim 3, wherein each leg of the tripod style support has a flat plate under each leg.

5. The stabilization system according to claim 4, wherein each of the flat plates has an edge angled upward, and each angled edge is attached to the angled edge of another leg by a chain.

6. A stabilization system for mounting on the underside of a trailer, comprising:
   a rail for mounting on the underside of a trailer;
   a pair of adjustable spaced apart supports, each support adjustable independent of the other and slidably mounted in said rail and attached to each other with cross braces.

7. The stabilization system according to claim 6, including a screw mechanism in each support for raising or lowering each of the pair of adjustable supports independent of each other.

8. The stabilization system according to claim 6, wherein each of said adjustable supports includes a plate slidably mounted in said rail.

9. The stabilization system according to claim 6, including a tripod style support for a trailer.

10. The stabilization system according to claim 9, wherein each leg of the tripod style support has a flat plate under each leg.

11. The stabilization system according to claim 10, wherein each flat plate has an edge angled upward, and each angled edge is attached to the angled edge of the other legs by a chain and chain load binder.

* * * * *